Nov. 21, 1967 J. N. WHITTAKER ETAL 3,354,396
DEVICE FOR GENERATING AN ELECTRIC SIGNAL COMPOSED OF AT LEAST TWO INTERLACED SIGNALS OF DIFFERENT BUT RELATING FREQUENCIES
Filed Nov. 16, 1964
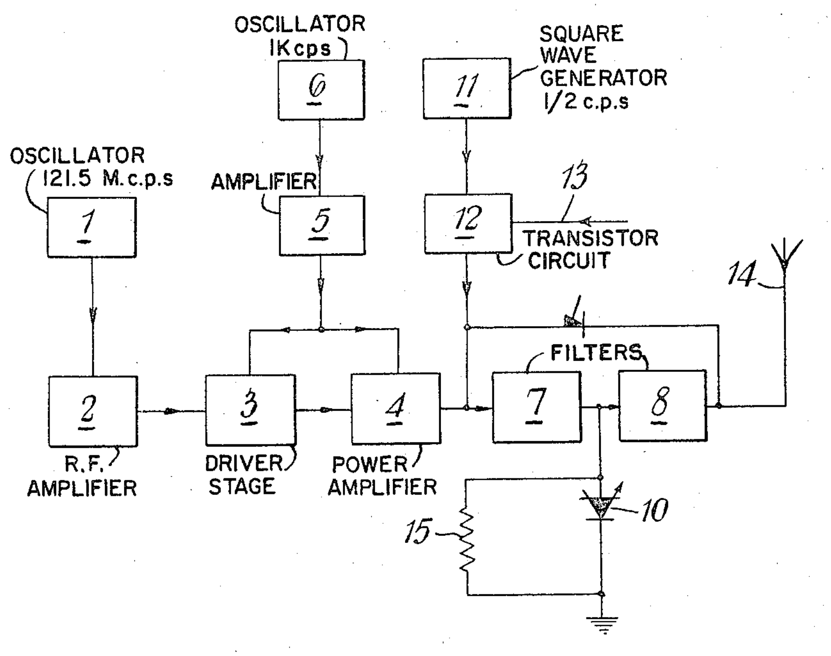
Inventors:
John Norman Whittaker
Peter William Carney
By: Bailey, Stephens & Huettig
Attorneys United States Patent Office 3,354,396
Patented Nov. 21, 1967

3,354,396

DEVICE FOR GENERATING AN ELECTRIC SIGNAL COMPOSED OF AT LEAST TWO INTERLACED SIGNALS OF DIFFERENT BUT RELATING FREQUENCIES

John N. Whittaker, Edgeware, and Peter W. Carney, Stanmore, England, assignors to Elliott Brothers (London) Limited, London, England, a company of Great Britain Filed Nov. 16, 1964, Ser. No. 411,324
Claims priority, application Great Britain, Nov. 22, 1963, 46,239/63
13 Claims. (Cl. 325—153)

This invention relates to electric signal generating devices and is particularly concerned with such devices for producing an output signal composed of at least two interlaced signals of different but related frequencies.

Broadly stated, the present invention provides an electric signal generating device comprising means for generating a first signal at a selected frequency, means responsive to said first signal to generate a second signal at a frequency which is a function of the frequency of the first signal, a unidirectional current conducting device electrically connected across said second signal generating means and means for selectively switching said unidirectional current conducting device between the conducting condition in which said second signal generating means is inoperative to provide an output signal at the frequency of the first signal and the non-conducting condition in which said second signal generating means is operative to provide an output signal at the frequency of the second signal.

More particularly, the present invention provides an electric signal generating device comprising means for generating a first signal at a first selected carrier frequency, means for modulating the first signal at a selected modulating frequency, means for applying the modulated first signal to second signal generating means operable in response to the first signal to generate a second signal modulated at the same frequency as the first signal and having a second carrier frequency which is a harmonic of the first carrier frequency, a unidirectional current conducting device connected across said second signal generating means to by-pass said second signal generating means when in the conducting condition, and switch means operable at a selected switching frequency to apply a bias signal to said unidirectional current device and said second signal generating means in the sense to switch said unidirectional current device between the conducting and non-conducting condition and said second signal generating means between the inoperative and operative condition to produce an output signal composed of said first and second signals interlaced with each other.

Preferably, the unidirectional current conducting device is a solid-state device and the second signal generating means comprises a varactor diode which, as is known, is a solid state device the capacitance of which is variable as a function of an applied voltage, such devices being sometimes referred to as parametric diodes or as voltage variable capacitors.

With advantage, the second signal generating means comprises a first filter circuit connected in series with a second filter circuit with the varactor diode suitably biased and electrically connected between the junction of the first and second filter circuits and earth, the first filter circuit being designed to reject the second carrier frequency, the second filter circuit being designed to reject the first carrier frequency and the varactor diode being arranged, upon application of the bias signal in the sense to switch the unidirectional current conducting device to the non-conducting condition, to multiply the first carrier frequency up to the second carrier frequency.

The invention is of particular, but not exclusive, application in a V.H.F./U.H.F. survival beacon which can be constructed of solid state devices to produce an output signal composed of two interlaced signals the first of which has a carrier frequency of 121.5 mc./s. and the second of which has a carrier frequency of 243 mc./s. so as to be compatible with existing distress signal receiving equipments which operate on one or other of the two frequencies referred to.

One embodiment of the invention will now be described by way of example, reference being made to the accompanying block schematic diagram of an electric signal generating device according to the invention.

This example is concerned with a completely solid state survival beacon designed to provide an output compatible with distress signal receiving equipment operating on either V.H.F. (121.5 mc./s.) or U.H.F. (243 mc./s.) frequency.

The beacon comprises a crystal controlled oscillator 1 which generates a carrier wave signal at a first carrier frequency of 121.5 mc./s. and supplies this signal through an R.F. amplifier 2 to a driver stage 3 connected in series with a power amplifier stage 4. This carrier wave signal is amplitude modulated to greater than 90% by an audio frequency of 1 kc./s. by means of a transformer (not shown) in the D.C. line to the driver and amplifier stages 3 and 4 driven by a push-pull audio amplifier 5 supplied from a 1 kc./s. oscillator 6. This modulated carrier wave signal is supplied to the input of two serially connected filter circuits 7 and 8, the first filter circuit 7 being designed to reject the second harmonic of the carrier wave frequency, i.e. 243 mc./s. and the second filter circuit being designed to reject the fundamental frequency of 121.5 mc./s. A unidirectional current conducting device in the form of a solid state diode 9 is connected between the input to the first filter circuit 7 and the output of the second filter circuit 8 and a varactor diode 10 and a biasing resistor 15 are connected between the junction of the filter circuits 7 and 8 and earth. A square wave generator 11 is provided to generate a square wave signal at a repetition frequency of 0.5 c./s. to switch a transistor circuit 12 controlling the application of a biasing voltage to the input side of the filter circuit 7, the biasing voltage being supplied via the transistor circuit 12 from line 13. The output side of the filter circuit 8 is connected to a dual frequency aerial 14.

In the operation of the beacon described, the modulated carrier wave at the fundamental frequency of 121.5 mc./s. is supplied to the input side of the filter circuit 7. Also applied to the input side of the filter circuit 7 is a biasing voltage controlled by the transistor circuit 12 so that this biasing voltage is applied for periods of 1 second at intervals of 1 second. This biasing voltage is such that, when applied, the diode 9 conducts and effectively short-circuits the filter circuits 7 and 8 so that the modulated carrier wave at the fundamental frequency is supplied via the diode 9 to the aerial 14 and transmitted. At the same time, varactor diode 10 is completely inoperative. In the absence of the biasing voltage, the diode 9 is non-conducting, and the varactor diode produces a negative self-biasing D.C. voltage across the resistor 15 and operates as a frequency multiplier to double the fundamental carrier frequency appearing at the output side of the filter circuit 7 and apply it to the input of the filter circuit 8. The filter circuit 8 filters off any signal at the fundamental frequency of 121.5 mc./s. and delivers to the aerial 14 an amplitude modulated output signal having a carrier frequency of 243 mc./s. The filter circuit 7 operates to prevent the signal having the doubled carrier wave frequency circulating through the varactor circuit and producing further doubled harmonics. The aerial 14, therefore, receives and radiates an amplitude modulated signal which is composed of a first signal having a carrier wave of 121.5 mc./s. interlaced with a second signal of 243 mc./s. so that the radiated signal is capable of being detected by receiving equipment operating on either frequency.

What we claim is:

1. An electric signal generating device comprising means for generating a first signal at a selected frequency, means responsive to said first signal to generate a second signal at a frequency which is a function of the frequency of the first signal, a unidirectional current conducting device electrically connected across said second signal generating means and means for selectively switching said unidirectional current conducting device between the conducting condition in which said second signal generating means is inoperative whereby an output signal at the frequency of the first signal is provided and the non-conducting condition in which said second signal generating means is operative to provide an output signal at the frequency of the second signal.

2. An electric signal generating device comprising means for generating a first signal at a first selected carrier frequency, means for modulating the first signal at a selected modulating frequency, means for applying the modulated first signal to second signal generating means operable in response to the first signal to generate a second signal modulated at the same frequency as the first signal and having a second carrier frequency which is a harmonic of the first carrier frequency, a unidirectional current conducting device connected across said second signal generating means to by-pass said second signal generating means when in the conducting condition, and switch means operable at a selected switching frequency to apply a bias signal to said unidirectional current device and said second signal generating means in the sense to switch said unidirectional current device between the conducting and non-conducting condition and said second signal generating means between the inoperative and operative condition to produce an output signal composed of said first and second signals interlaced with each other.

3. A device according to claim 1 wherein the unidirectional current conducting device is a solid state device.

4. A device according to claim 1, wherein the second signal generating means includes a varactor diode.

5. An electric signal generating device comprising means for generating a first signal at a first selected carrier frequency, means for modulating the first signal at a selected modulated frequency, second signal generating means having an input connnected to the output of said modulating means and operable in response to said modulated first signal to generate a second signal modulated at said selected modulating frequency and having a second carrier frequency which is a harmonic of said first carrier frequency, transmitting means connected to the output of said second signal generating means, a bistable device connected across said second signal generating means and operable in one stable state to short-circuit said second signal generating device and apply said first modulated signal to said transmitting means and in the other stable state to provide an effective open-circuit whereby said second signal is applied to said transmitting device and means for switching said bistable device between said one and said other stable states.

6. A device according to claim 2 wherein the second signal generating means comprises a first filter circuit operable to reject the second carrier frequency, means for transforming the output of said first filter circuit to said second carrier frequency and a second filter circuit connected to said transforming means and operable to reject said first carrier frequency.

7. A device according to claim 6 wherein the second carrier frequency is twice that of the first carrier frequency, the first filter circuit is operable to reject second harmonics of said first carrier frequency and the transforming means is operable to double the carrier frequency of the output of the filter circuit.

8. An electric signal generating device comprising means for generating a first signal at a first selected carrier frequency, means for modulating said first signal at a selected modulating frequency, a first filter circuit supplied with said first modulated signal and operable to pass said first carrier frequency signal and reject at least the second harmonic thereof, a frequency multiplier circuit supplied with the output of said first filter and operable to provide a second signal having a second carrier frequency which is a predetermined multiple of said first carrier frequency modulated at said selected modulating frequency, a second filter circuit supplied with the output of said multiplier circuit and operable to pass said second carrier frequency signal and reject at least the first sub-harmonic thereof, a transmitter device connected to the output of said second filter circuit, a bistable device connected between the input to said first filter circuit and the output of said second filter circuit and operable in one state to provide a short-circuit connecting said first carrier frequency signal to said transmitting device and in the other state to provide an effective open circuit whereby said second carrier frequency signal is applied to said transmitting device and means for switching said bistable device between said two states.

9. A device according to claim 8 wherein said frequency multiplier circuit is a frequency doubler circuit.

10. A device according to claim 8 wherein said bistable device is a unidirectional current conducting solid state device.

11. A device according to claim 8 wherein said switch means comprises a bias voltage source, circuit means capable of being switched from the fully conducting condition in which said bias voltage is applied to said bistable device to the substantially non-conducting condition in which said bias voltage is isolated from said bistable device and a source of pulses having a selected repetition frequency connected to said circuit means to switch said circuit means from the fully conducting condition to the substantially non-conducting condition at said selected repetition frequency.

12. A device according to claim 8 wherein said multiplier circuit includes a solid state device the capacitance of which is variable as a function of the applied voltage.

13. A device according to claim 8 in which said first signal carrier frequency is 121.5 mc./s. and said second signal carrier frequency is 243 mc./s.

References Cited

UNITED STATES PATENTS

| | | | |
|---|---|---|---|
| 2,459,281 | 1/1949 | McDonald | 325—155 X |
| 2,505,781 | 5/1950 | Mallinson | 325—155 |
| 2,820,902 | 1/1958 | Levin | 331—76 |
| 3,108,223 | 10/1963 | Hunter | 325—105 |
| 3,176,229 | 3/1965 | Pierce | 325—105 |
| 3,235,817 | 2/1966 | Stapelfeldt | 325—105 X |

JOHN W. CALDWELL, *Acting Primary Examiner.*